US012012882B1

(12) United States Patent
Wante et al.

(10) Patent No.: US 12,012,882 B1
(45) Date of Patent: Jun. 18, 2024

(54) VEHICLE BYPASS CATALYST DIAGNOSTIC SYSTEM

(71) Applicant: FCA US LLC, Auburn Hills, MI (US)

(72) Inventors: Steven C Wante, Chelsea, MI (US); Roger C Sager, Munith, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/342,309

(22) Filed: Jun. 27, 2023

(51) Int. Cl.
| | | |
|---|---|---|
| *F01N 11/00* | (2006.01) |
| *F01N 3/28* | (2006.01) |
| *F01N 13/00* | (2010.01) |
| *F02B 37/18* | (2006.01) |
| *G01M 15/10* | (2006.01) |
| *G07C 5/08* | (2006.01) |

(52) U.S. Cl.
CPC .......... *F01N 11/007* (2013.01); *F01N 3/2892* (2013.01); *F01N 13/008* (2013.01); *F01N 13/0093* (2014.06); *F02B 37/183* (2013.01); *G01M 15/104* (2013.01); *G07C 5/0808* (2013.01); *G07C 5/0825* (2013.01); *F01N 2410/06* (2013.01); *F01N 2550/02* (2013.01); *F01N 2550/10* (2013.01); *F01N 2560/025* (2013.01); *F01N 2900/0416* (2013.01); *F01N 2900/0418* (2013.01); *F01N 2900/1624* (2013.01)

(58) Field of Classification Search
CPC ......... F01N 2410/06; F01N 2900/0416; F01N 2900/0418; F01N 2900/1624; F01N 11/007; F01N 3/2892; F01N 13/008; F01N 13/0093; F01N 2550/02; F01N 2550/10; F01N 2560/025; F02B 37/183; G01M 15/104; G07C 5/0808; G07C 5/0825
See application file for complete search history.

(56) References Cited

U.S. PATENT DOCUMENTS

| | | | | |
|---|---|---|---|---|
| 8,074,441 | B2 * | 12/2011 | Fujiwara | ............... F01N 11/007 60/276 |
| 2015/0308364 | A1 * | 10/2015 | Hojo | ......................... F01N 9/00 60/285 |

* cited by examiner

*Primary Examiner* — Brandon D Lee
(74) *Attorney, Agent, or Firm* — Jeremy J. Klobucar

(57) ABSTRACT

An internal combustion engine system includes an internal combustion engine, a main exhaust aftertreatment system with a main catalytic converter, and a light-off catalyst bypass system with a bypass passage and a bypass catalytic converter. An emissions control system includes a controller in signal communication with a first oxygen sensor disposed upstream of the bypass catalytic converter, and a second oxygen sensor disposed downstream. The emissions control system performs a diagnostic of the bypass catalytic converter, by the controller, including (i) monitoring signals from the first and second oxygen sensors for a predetermined time period during an engine cold start condition, (ii) determining a ratio of oxygen content at the second oxygen to the first oxygen sensor based on the signals from the first and second oxygen sensors, and (iii) comparing the determined ratio to a predetermined threshold ratio to determine if the bypass catalytic converter has failed.

20 Claims, 3 Drawing Sheets

VEHICLE BYPASS CATALYST DIAGNOSTIC SYSTEM

FIELD

The present application relates generally to vehicle engine exhaust treatment systems and, more particularly, to diagnostics for an internal combustion engine having a light-off catalyst bypass system.

BACKGROUND

In conventional engine exhaust aftertreatment systems it is difficult to achieve low tailpipe emissions in the time immediately following a cold engine start due to low catalyst conversion efficiency of cold catalysts. In order to achieve acceptable conversion efficiency, the catalyst must surpass a predetermined light-off temperature. In some systems, faster light-off temperatures may be achieved, but often at the cost of high exhaust system backpressure, durability, longevity, cost, and/or complexity. Thus, while such conventional systems do work for their intended purpose, it is desirable to provide continuous improvement in the relevant art.

SUMMARY

In accordance with one example aspect of the invention, an internal combustion engine system is provided. In one example implementation, the engine system includes an internal combustion engine, a main exhaust aftertreatment system with a main catalytic converter configured to receive exhaust gas from the internal combustion engine, and a light-off catalyst bypass system with a bypass passage and a bypass catalytic converter configured to selectively receive exhaust gas from the internal combustion engine. An emissions control system includes a controller in signal communication with a first oxygen sensor disposed upstream of the bypass catalytic converter, and a second oxygen sensor disposed downstream of the bypass catalytic converter. The emissions control system is configured to perform a diagnostic of the bypass catalytic converter, including (i) monitoring, by the controller, signals from the first and second oxygen sensors for a predetermined time period during an engine cold start condition, (ii) determining, by the controller, a ratio of oxygen content at the second oxygen sensor to oxygen content at the first oxygen sensor based on the signals from the first and second oxygen sensors, and (iii) comparing, by the controller, the determined ratio to a predetermined threshold ratio to determine if the bypass catalytic converter has failed.

In addition to the foregoing, the described engine system may include one or more of the following features: wherein the bypass catalytic converter diagnostic is performed only during the engine cold start condition before the main catalytic converter has reached a light-off temperature; wherein performing the diagnostic of the bypass catalytic converter further includes comparing, by the controller, the determined ratio to a second predetermined threshold ratio to determine if the bypass catalytic converter is aged and has reached a useful life threshold; and wherein performing the diagnostic of the bypass catalytic converter further includes comparing, by the controller, the determined ratio to a third predetermined threshold ratio to determine if the bypass catalytic converter is meeting predetermined efficiency conditions.

In addition to the foregoing, the described engine system may include one or more of the following features: wherein the signals from the first and second oxygen sensors are voltage signals indicating an oxygen content of the exhaust gas; an exhaust manifold configured to supply exhaust gas through a main outlet duct to the main exhaust aftertreatment system and the main catalytic converter, wherein the bypass passage is in fluid communication with the exhaust manifold; and a bypass valve configured to move between a first position that enables exhaust gas to flow through the bypass passage, and a second position that prevents exhaust gas flow through the bypass passage and bypass catalytic converter.

In addition to the foregoing, the described engine system may include one or more of the following features: a turbocharger having a turbine, wherein the bypass passage is configured to bypass the turbine; wherein when the bypass valve is in the first position, the turbine is operated in a reverse rotation to facilitate preventing the exhaust gas from passing through the turbine; and wherein the ratio is determined from an accumulation of oxygen content signals from the first oxygen sensor over the predetermined time period, and an accumulation of oxygen content signals from the second oxygen sensor over the predetermined time period.

In accordance with another example aspect of the invention, diagnostic method for a bypass catalytic converter of an internal combustion engine system is provided. In one example implementation, the engine system includes an internal combustion engine, a main exhaust aftertreatment system with a main catalytic converter configured to receive exhaust gas from the internal combustion engine, and a light-off catalyst bypass system with a bypass passage and the bypass catalytic converter configured to selectively receive exhaust gas from the internal combustion engine. An emissions control system includes a controller in signal communication with a first oxygen sensor disposed upstream of the bypass catalytic converter, and a second oxygen sensor disposed downstream of the bypass catalytic converter.

The diagnostic method includes (i) monitoring, by the controller, signals from the first and second oxygen sensors for a predetermined time period during an engine cold start condition, (ii) determining, by the controller, a ratio of oxygen content at the second oxygen sensor to oxygen content at the first oxygen sensor based on the signals from the first and second oxygen sensors, and (iii) comparing, by the controller, the determined ratio to a predetermined threshold to determine if the bypass catalytic converter has failed.

In addition to the foregoing, the described diagnostic method may include one or more of the following features: wherein the bypass catalytic converter diagnostic is performed only during the engine cold start condition before the main catalytic converter has reached a light-off temperature; comparing, by the controller, the determined ratio to a second predetermined threshold ratio to determine if the bypass catalytic converter is aged and has reached a useful life threshold; comparing, by the controller, the determined ratio to a third predetermined threshold ratio to determine if the bypass catalytic converter is meeting predetermined efficiency conditions.

In addition to the foregoing, the described diagnostic method may include one or more of the following features: wherein the signals from the first and second oxygen sensors are voltage signals indicating an oxygen content of the exhaust gas; and wherein the light-off catalyst bypass system further includes a bypass valve in signal communication with the controller and configured to move between a first position that enables exhaust gas to flow through the bypass passage, and a second position that prevents exhaust gas flow through the bypass passage and bypass catalytic converter.

In addition to the foregoing, the described diagnostic method may include one or more of the following features: determining, by the controller, if the internal combustion engine is under the cold start condition, and moving, by the controller, the bypass valve to the first position if the engine is under the cold start condition; determining, by the controller, a low-flow condition exists in the engine exhaust before monitoring the signals from the first and second oxygen sensors; illuminating a malfunction indicator light (MIL) if the bypass catalytic converter is determined to have failed; and wherein the predetermined time period is between five seconds and fifteen seconds.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
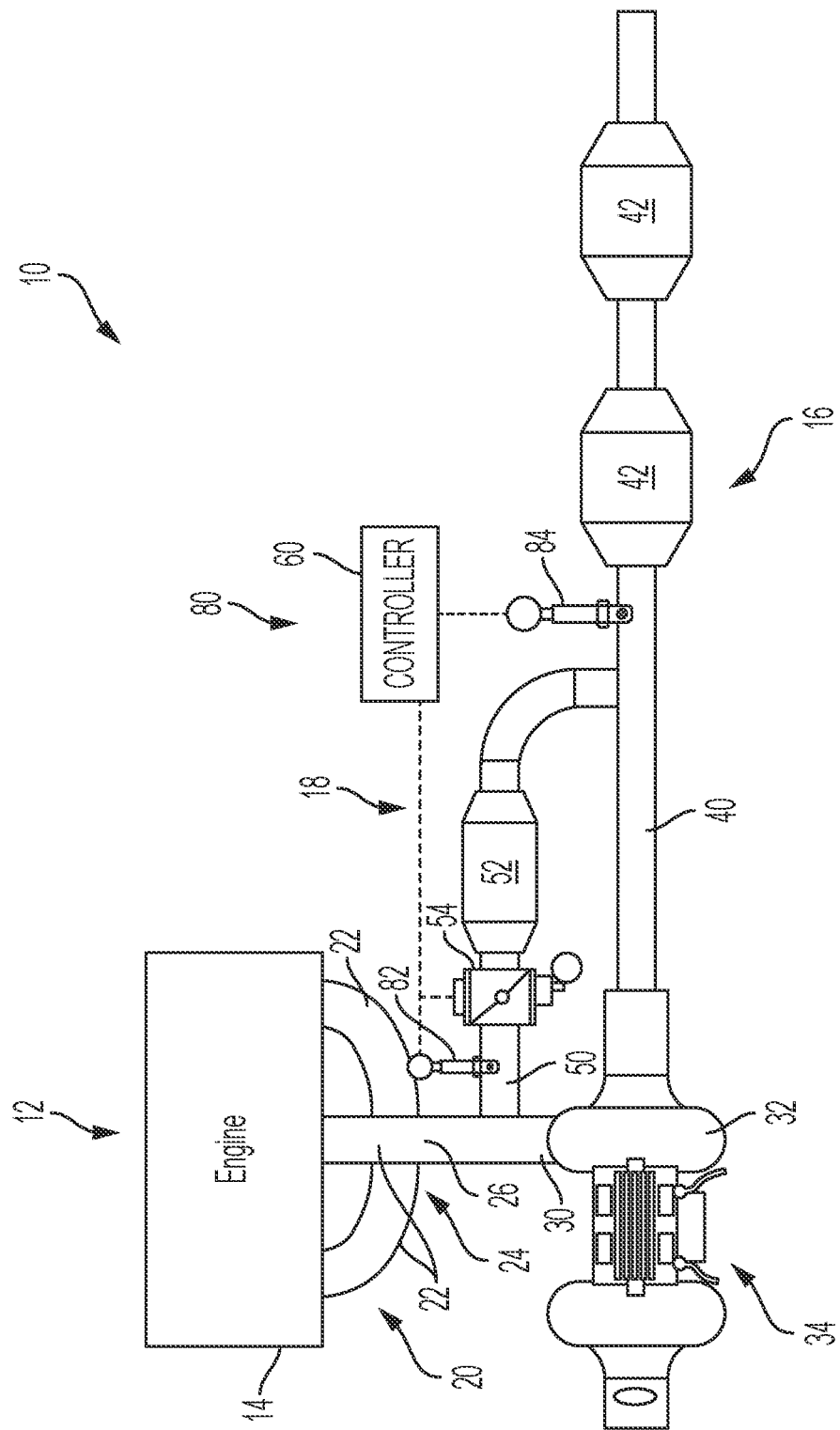
FIG. 1 is a schematic illustration of an example internal combustion engine with a light-off catalyst bypass system, in accordance with the principles of the present application.

Some conventional aftertreatment systems have limited or no capacity to get the catalyst to a light-off temperature for efficient conversion of harmful exhaust constituents before approximately fifteen seconds post cold start in a turbocharged system. Every second the engine is running and the catalyst is not at or above light-off temperature, exhaust gas constituents such as CO, CO2, O2, HC, NMHC and NOx are not being converted efficiently. The short time preceding the catalyst light-off is responsible for a very large portion of the CO, HC, and NOx breakthrough for on and off cycle starts and long idles. In conventional systems, one or more catalysts are traditionally located some distance downstream of the exhaust outlet and/or turbocharger outlet and are typically in the main exhaust flow for the entire useful life of the vehicle.

As the distance, wetted surface area, and thermal mass located between the exhaust ports and catalyst face increases, it becomes increasingly difficult to have the catalyst light-off in a timely manner. Common hardware designs to decrease time to light-off include decreasing distance to the catalyst. However, this often comes at the expense of the life of the catalyst because of higher temperature, gas velocities, and thermal gradients. Further, as a catalyst is subjected to exhaust flow, high temperatures, and/or unwanted chemicals, it slowly loses capacity for efficient conversion (catalyst aging). Conventional systems typically account for this catalyst aging by increasing precious metal loading, catalyst volume, and catalyst surface area, which can potentially be a resource burden and increase complexity of the systems.

Accordingly, described herein are systems and methods for a catalyst bypass system for improving tailpipe emissions during operation of an internal combustion engine. The system utilizes a light-off catalyst bypass system with an additional integrated catalyst. During system operation, the exhaust gas is routed directly to one or more bypass catalysts before it re-enters the main exhaust path. This will allow for rapid catalyst light-off of the bypass catalyst and improved conversion of harmful exhaust constituents. Further, in order to ensure vehicle emissions standards compliance, as well as confirm proper function and remaining useful life of the bypass catalyst, the light-off catalyst bypass system includes diagnostic systems and methods, as will be described herein in more detail.

In the example embodiments, the light-off catalyst bypass system includes a bypass valve and an auxiliary bypass catalyst. The bypass valve is configured to be used in combination with a bypass flow passage having the bypass catalyst. An inlet to the bypass catalyst system is located before a turbine inlet or at/near the exhaust manifold collector. In some examples, the inlet is located as close as possible to the exhaust ports or cylinder head to minimize heat losses from the exhaust gas. As such, the close proximity of the bypass catalyst to the exhaust gas in the cylinder head enables rapid heating to hasten the conversion rate of harmful exhaust constituents.

Due to its small size and low surface area/distance between it and the exhaust valves, the bypass catalyst warms up much quicker than the conventional catalyst. During a cold engine start up event or other situation where it is desirable to have the exhaust gas flow through the catalyst bypass system, the bypass valve is actuated to restrict flow to the turbine and route the exhaust gas through the light-off catalyst bypass system. Restricting flow from going directly to the turbine and to the conventional catalyst during cold start is desirable because the conventional catalyst cannot effectively convert exhaust constituents before it reaches a minimum or catalyst "light-off" temperature. The gas exiting the bypass catalyst is then directed to the main catalyst to assist it in achieving a quicker light-off.

In the example embodiment, the system has two main positions, a bypass position and a default position. The bypass position is enabled when the bypass valve restricts main exhaust flow through the turbine and the exhaust gases are routed through the bypass catalyst system. The default position is enabled when the bypass valve allows main exhaust flow through the turbine. Once the main catalyst light-off is achieved, the valve can begin actuating to the default position.

Advantages of the system include: extremely fast catalyst light-off times, the ability to selectively drive most or all of the exhaust flow through a bypass catalyst before going through the main exhaust path; extremely short distance, surface area, and thermal mass between the exhaust ports and the bypass catalyst via bypassing the turbocharger turbine; the ability to deactivate the bypass catalyst after light-off; extremely high cell density substrate in the catalyst that would not be used in a non-bypassable system due to excessive backpressure; and the ability to move PGM (platinum group metals) away from the main catalyst and onto the bypass catalyst for better PGM utilization.

After rapid light-off, the catalyst begins effectively converting exhaust constituents via exothermic reactions and producing more exhaust heat, which assists in heating up the main catalyst. Once the main catalyst reaches light-off temperature, the bypass valve can be closed to block off the bypass catalyst and the conventional exhaust flow can continue. Selective deactivation of the bypass catalyst system provides benefits for both the bypass and main catalyst.

In one example, the bypass catalyst can have high precious metal loading with high cell density substrate so that it has very high conversion efficiency at cold start. Such a high cell density substrate could potentially cause significant exhaust backpressure in a conventional system, as well as speed aging due to continuous exposure to high exhaust temperatures and flows. Neither backpressure nor aging are concerns in the current system since the auxiliary bypass catalyst can be bypassed outside of cold start conditions. Similarly, the main catalyst can use fewer precious metals since it is not relied upon for cold start emissions. Precious metal loading of the main (and much larger) catalyst can make up a significant cost of the emissions system and is also responsible for aging or performance degradation of the emissions system during its full useful life. As such, the system allows for increased emission system efficacy with decreased degradation due to aging.

With initial reference to FIG. 1, an internal combustion engine system 10 having an internal combustion engine 12 with a cylinder head 14 is illustrated in accordance with the principles of the present application. In the example embodiment, the cylinder head 14 is configured to selectively supply exhaust gas to a main exhaust aftertreatment system 16 and a light-off catalyst bypass system 18. As described herein in more detail, the light-off catalyst bypass system 18 is selectively utilized during cold start, long idle, and/or cold catalyst conditions to rapidly heat to light-off temperatures to quickly achieve low tailpipe emissions.

As shown in FIG. 1, the engine system 10 further includes an exhaust manifold 20 having a plurality of cylinder exhaust passages 22 that merge together to form a collector portion or main exhaust passage 24 having an outlet 26. In some embodiments, the exhaust manifold 20 may be coupled (e.g., bolted) to the cylinder head 14 or alternatively integrated therein. A main outlet duct 30 receives exhaust gas from the manifold outlet 26 and is configured to direct the exhaust gas to the main exhaust aftertreatment system 16. In the illustrated example, the main outlet duct 30 configured to provide exhaust gas to a charger device, such as a turbine 32 of a turbocharger 34. It will be appreciated that the charger device may be a supercharger rather than a turbocharger, or engine 12 may not include a charger device such that main outlet duct 30 is directly connected to the main exhaust aftertreatment system 16.

In the example embodiment, the main exhaust aftertreatment system 16 generally includes a main exhaust conduit 40 having one or more main catalytic converters 42 to reduce or convert a desired exhaust gas constituent such as, for example, carbon monoxide (CO), hydrocarbon (HC), and/or nitrogen oxides (NOx). The main exhaust conduit 40 is fluidly coupled to the exhaust manifold main outlet 26 (optionally via the turbocharger turbine 32) and is configured to receive exhaust gas from the vehicle engine 12 and supply the exhaust gas to the main catalytic converter 42. In order to efficiently reduce or convert CO, HC, and NOx, the main catalytic converter 42 must reach a predetermined light-off temperature. However, during some vehicle operations such as cold starts, the main catalytic converter 42 is below light-off temperature and therefore has a low catalyst conversion efficiency.

In order efficiently reduce or convert the unwanted exhaust gas constituents while the main catalytic converter 42 is below the light-off temperature, the vehicle utilizes the light-off catalyst bypass system 18, which generally includes a bypass passage 50, a bypass catalytic converter ("bypass catalyst") 52, and a bypass valve 54. The light-off catalyst bypass system 18 is configured to redirect at least a portion of the exhaust gas from the exhaust manifold 20, into the bypass passage 50, and through the auxiliary bypass catalyst 52. Because the bypass catalyst 52 is located close to the cylinder head 14, it is in close proximity to the engine combustion chambers and receives the exhaust gas quicker and at a higher temperature than the main catalytic converter 42 would. Thus, the bypass catalyst 52 is rapidly heated to its predetermined light-off temperature to achieve high catalyst conversion efficiency before the main catalytic converter 42 alone. It will be appreciated that the light-off catalyst bypass system 18 may have various configurations and be integrated with or into the cylinder head 14 in various manners. Some example configurations are shown and described in commonly owned U.S. patent application Ser. No. 17/158,258, filed Jan. 26, 2021 and U.S. patent application Ser. No. 18/309,382, filed Apr. 28, 2023, the entire contents of which are incorporated herein by reference thereto.

A controller 60 (e.g., engine control unit) is in signal communication with the bypass valve 54 and is configured to move the bypass valve 54 to any position between a fully open first position and a fully closed second position. In the first position, the bypass valve 54 enabled exhaust gas to flow through the bypass passage 50 and thus the bypass catalyst 52. In the second position, the bypass valve 54 prevents exhaust gas from flowing through the bypass passage 50 and bypass catalyst 52. Although illustrated in the example implementation as a butterfly valve, it will be appreciated that bypass valve 54 may be any suitable valve that enables light-off catalyst bypass system 18 to operate as described herein.

In one example, the bypass catalyst 52 is a three-way catalyst configured to remove CO, HC, and NOx from the exhaust gas passing therethrough, as described herein in more detail. However, it will be appreciated that bypass catalyst 52 may be any suitable catalyst that enables light-off catalyst bypass system 18 to remove any desired pollutant or compound such as, for example, a hydrocarbon trap or a four-way catalyst. In another example, bypass catalyst 52 has a cell density of between approximately 800 and approximately 1200 cells per square inch, or between 800 and 1200 cells per square inch.

In the example embodiment, the light-off catalyst bypass system 18 is configured to selectively operate in (i) a normal or warm catalyst mode and (ii) a cold catalyst mode. In the warm catalyst mode, controller 60 determines the main catalytic converter 42 has reached the predetermined light-off temperature (e.g., via temperature sensor, modeled, etc.) and moves the bypass valve 54 to the fully closed position. In this mode, the bypass valve 54 facilitates preventing the exhaust gas in the exhaust manifold 20 from entering the bypass passage 50 and thus bypass catalyst 52. Instead, the exhaust gas is directed through main exhaust passage 24, the turbocharger turbine 32 (if present), into the main exhaust conduit 40, and through the main catalytic converter 42 before being exhausted to the atmosphere.

In the cold catalyst mode, controller 60 determines the main catalytic converter 42 is below the predetermined light-off temperature (e.g., a cold start), and subsequently moves the bypass valve 54 to the fully open position. In this mode, the bypass valve 54 enables the exhaust gas to be directed through bypass passage 50 and bypass catalyst 52 before being directed to the main exhaust conduit 40 and atmosphere. In some implementations, the turbocharger 32 may be operated in a reverse rotation to facilitate preventing the exhaust gas in the exhaust manifold 20 from going through the turbine 32 to the main exhaust conduit 40. Once the main catalytic converter 42 has reached the light-off temperature, the controller 60 may then switch the light-off catalyst bypass system 18 to the normal mode.

Figure 2:
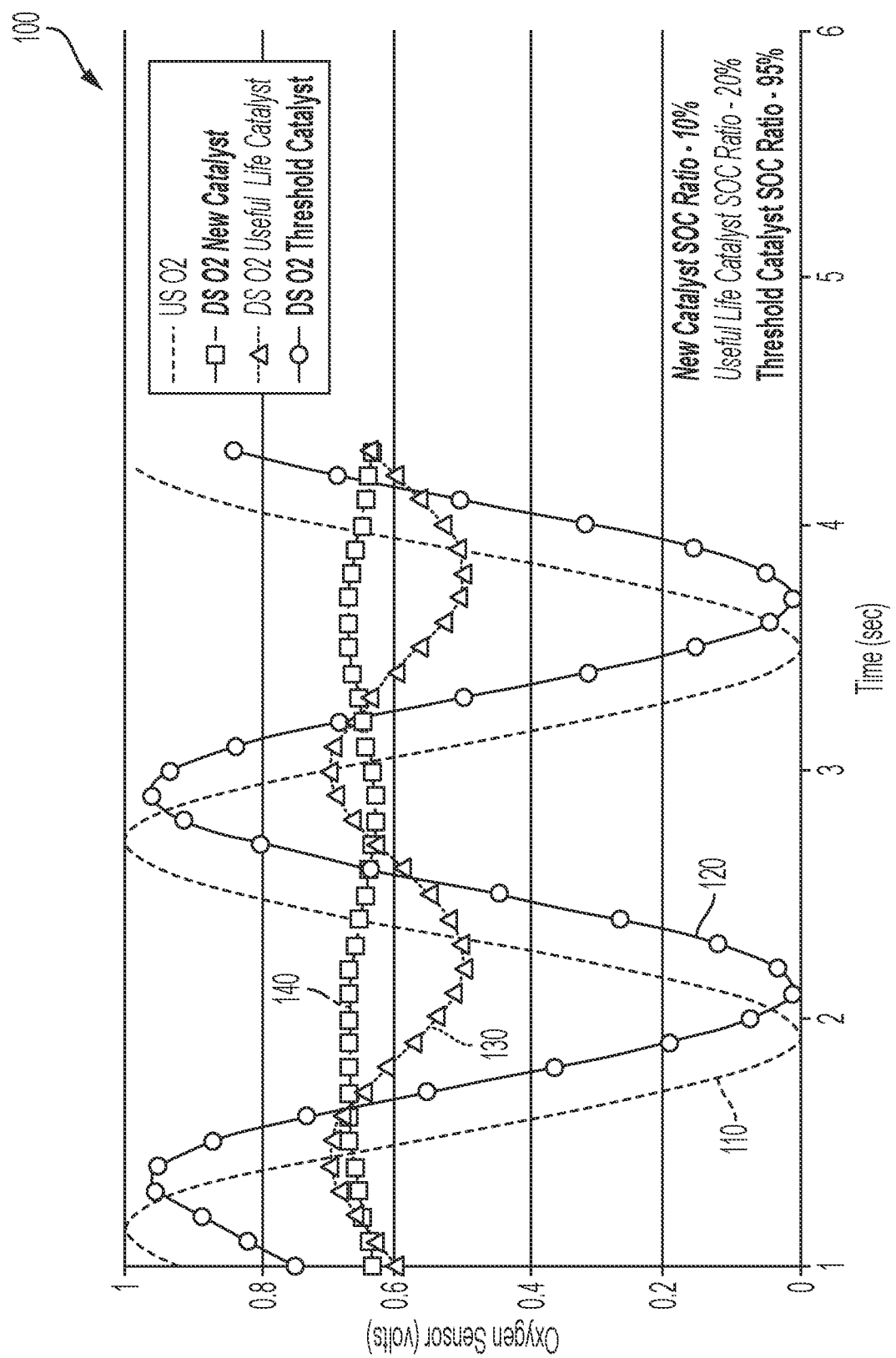
FIG. 2 is a graph illustrating example diagnostic results of the light-off catalyst bypass system of FIG. 1, in accordance with the principles of the present application.

With reference now to FIGS. 1 and 2, light-off catalyst bypass system 18 further includes an emissions control system 80 configured to monitor the bypass catalyst 52 conversion efficiency, for example to ensure emissions regulations compliance and determine whether bypass catalyst 52 is operating as intended. In the example embodiment, the emissions control system 80 includes engine controller 60, which is configured to maintain a desired air-to-fuel ratio, as well as control other tasks such as spark timing, exhaust gas recirculation, onboard diagnostics, and the like. The emissions control system 80 may also include various sensors, transducers, or the like that are in communication with the controller 60 through inputs and outputs to further carry out the operations described herein.

In the example embodiment, the emissions control system 80 generally includes first and second oxygen sensors 82, 84 disposed in the bypass passage 50 to measure the level of oxygen in the exhaust gas passing therethrough. The first oxygen sensor 82 is disposed upstream of the bypass catalyst 52, and the second oxygen sensor 84 is disposed downstream of the bypass catalyst 52. As part of the emissions control system 80, the oxygen sensors 82, 84 are in signal communication with the engine controller 60.

FIG. 2 illustrates a graph 100 of an example bypass catalyst diagnostic evaluation that plots oxygen content detected in the upstream oxygen sensor 82 and the downstream oxygen sensor 84 during a bypass catalyst diagnostic. The oxygen sensors 82, 84 each provide a signal (e.g., in volts) to engine controller 60 indicating an oxygen content in the exhaust gas at that location, and the graph 100 plots the oxygen sensor O2 signal (y-axis) over time (x-axis). The O2 signal of the downstream oxygen sensor 84 is then compared to the O2 signal of the upstream oxygen sensor 82 to provide an oxygen sensor O2 ratio that indicates the operational health of the bypass catalyst 52. In the example embodiment, the oxygen sensor O2 ratio is determined with the following equation:

$$\text{SOC\_CM\_Raw\_Ratio} = \frac{\sum_{1}^{N}(|\text{DSO2\_StateChange}| * \text{DS\_CompMult})}{\sum_{1}^{N}(|\text{USO2\_StateChange}| * \text{US\_CompMult})}$$

where SOC_CM_Raw_Ratio is a value representing the relationship between the downstream oxygen sensor 84 and the upstream oxygen sensor 82, DSO2_StateChange is a downstream oxygen sensor 84 signal measured activity, DS_CompMult is a downstream oxygen sensor 84 signal compensation factor based on exhaust flow, USO2_StateChange is an upstream oxygen sensor 82 signal measured activity, and US_CompMult is an upstream oxygen sensor 82 signal compensation factor based on exhaust flow. In one example, the signal compensation factor is configured to normalize the O2 signal over different exhaust flows, which can affect the frequency of the O2 signal.

In the example embodiment, during bypass catalyst diagnostics, the engine controller 60 is configured to perform fuel rate cycling over a predefined time period (e.g., 5-15 seconds) to fluctuate the engine fuel control between lambda rich and lambda lean. As a result of the fuel rate cycling, the O2 signals of the oxygen sensors 82, 84 will fluctuate over time, for example as shown by the oscillating curves or lines in graph 100. As shown in FIG. 2, line 110 illustrates an example baseline upstream oxygen sensor O2 signal that occurs in bypass passage 50 before the bypass catalyst 52. Line 120 illustrates an example downstream oxygen sensor O2 signal that indicates a failed bypass catalyst efficiency. In one example, a failed bypass catalyst is one that exceeds OBD emissions limits.

In the illustrated example, line 120 shows a downstream oxygen sensor O2 signal, which closely follows the upstream oxygen sensor O2 signal line 110, thereby indicating that the failed bypass catalyst 52 is removing very little oxygen from the exhaust gas. As line 120 closely follows line 110, the ratio of the downstream to upstream O2 signals is close to one (95% in the illustrated example). Line 130 illustrates an example oxygen sensor O2 signal that indicates a useful life bypass catalyst. In the illustrated example, line 130 shows a downstream to upstream oxygen sensor O2 ratio of 20% thereby indicating the bypass catalyst 52 is aged. This is an example of a bypass catalyst when it has reached its useful life.

Line 140 illustrates an example oxygen sensor O2 signal that indicates a new or generally new bypass catalyst. In the illustrated example, line 140 shows a downstream to upstream oxygen sensor O2 ratio of 10%, which is a generally flat curve indicating the bypass catalyst 52 is removing most of the oxygen from the exhaust gas. However, it will be appreciated that the threshold ratio % for what constitutes a passing, aged, or failed bypass catalyst efficiency is variable and based on a multitude of factors such as, for example, catalyst type, system design, current emissions regulations, etc.

In one example bypass catalyst diagnostic operation of the emissions control system 80, engine controller 60 determines the engine 12 is running under a cold start or other predetermined condition. For example, engine controller 60 may determine a cold start based on signals from one or more temperature sensors (not shown) configured to monitor a temperature difference between engine coolant and ambient. Upon determining an engine cold start condition, the engine controller 60 subsequently opens the bypass valve 54 such that exhaust gas from the engine 12 is directed through the bypass passage 50 and thus the bypass catalyst 52.

At the next low-flow condition (e.g., idle), engine controller 60 monitors the upstream and downstream oxygen sensors 82, 84 for a predetermined period of time (e.g., 5-15 seconds). The engine controller 60 then determines the oxygen sensor O2 ratio of the downstream oxygen sensor 84 reading to the upstream oxygen sensor 82 reading over the predetermined time period. Engine controller 60 then determines a condition of the bypass catalyst 52 based on the determined oxygen sensor O2 ratio, and performs any subsequent operations based on the catalyst condition, such as illuminating a malfunction indicator light (MIL) on an instrument panel of the vehicle (e.g., if catalyst has failed).

Figure 3:
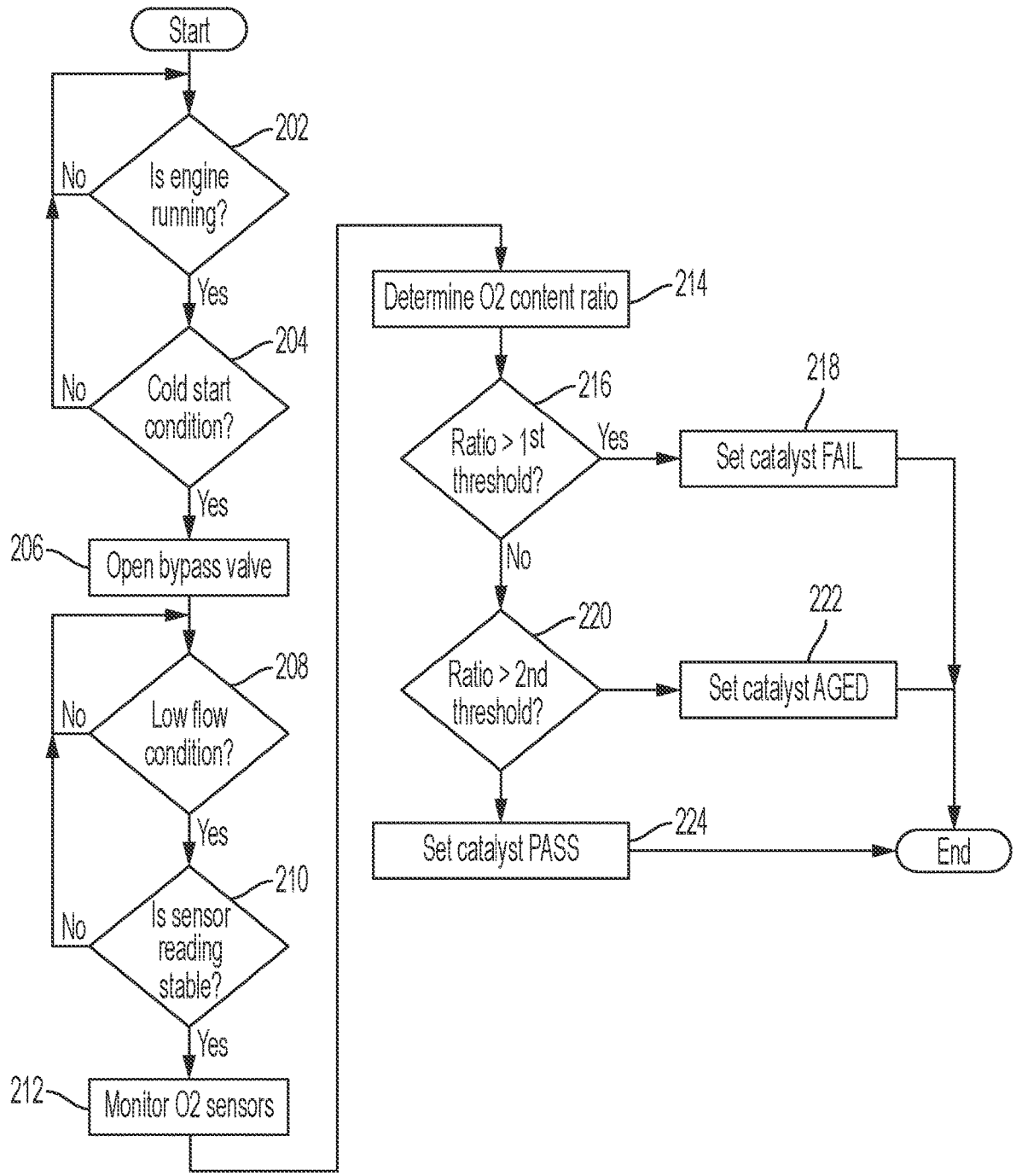
FIG. 3 is a flow diagram of an example diagnostic method for a bypass catalyst of the light-off catalyst bypass system, in accordance with the principles of the present application.

With reference now to FIG. 3, a flow diagram of an example diagnostic method 200 for the bypass catalyst 52 is illustrated. At step 202, engine controller 60 determines if the engine 12 is running. If no, control returns to step 202. If yes, at step 204, controller 60 determines if the engine 12 is under a cold start condition. For example, controller 60 may monitor one or more temperature sensors to determine if an engine coolant temperature is within a predetermined threshold of ambient temperature. If no, control ends or returns to step 202. If yes, at step 206, controller 60 opens bypass valve 54 to enable exhaust gas from the engine 12 to enter bypass passage 50 and bypass catalyst 52.

At step 208, controller 60 determines if a low-flow condition exists in the engine exhaust (e.g., engine is at idle). If no, control returns to step 208. If yes, at step 210, controller 60 determines if oxygen sensors 82, 84 are operational (e.g., have a stable reading) to ensure signal integrity thereof. If no, control returns to step 208. If yes, at step 212, controller 60 monitors signals (e.g., voltage signals) from the upstream and downstream oxygen sensors 82, 84 for a predetermined time period (e.g., 5-15 seconds). At step 214, controller 60 compares the oxygen sensor signals and determines a ratio of the oxygen content at the downstream oxygen sensor 84 to the oxygen content at the upstream oxygen sensor 82 over the predetermined time.

At step 216, controller 60 determines if the determined ratio is greater than a first threshold (e.g., 95%). If yes, at step 218, controller 60 sets the bypass catalyst diagnostic as FAIL, indicating a failed bypass catalyst efficiency. If no, at step 220, controller 60 determines if the determined ratio is greater than a second threshold (e.g., 20%). If yes, at step 222, controller 60 sets the bypass catalyst diagnostic as AGED, indicating an aged bypass catalyst efficiency. If no, at step 224, controller 60 sets the bypass catalyst diagnostic as PASS, indicating the bypass catalyst 52 is meeting predetermined conditions such as, for example, a predetermined O2 storage efficiency or a predetermined emissions level. Control then ends and is repeated, for example, at the next cold start.

Described herein are systems and methods for diagnostics to improve vehicle emissions systems efficiency during cold start temperature conditions. The system includes a light-off catalyst bypass passage that selectively provides a flow of exhaust gas to a bypass catalyst during an engine cold start phase. An emissions control system monitors oxygen sensors located upstream and downstream of the bypass catalyst during the cold start, and subsequently determines a ratio of the downstream exhaust gas oxygen content to the upstream exhaust gas oxygen content. The determined ratio is then compared to threshold values to determine an efficiency and useful life of the bypass catalyst.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An internal combustion engine system comprising:
   an internal combustion engine;
   a main exhaust aftertreatment system with a main catalytic converter configured to receive exhaust gas from the internal combustion engine;
   a light-off catalyst bypass system with a bypass passage and a bypass catalytic converter configured to selectively receive exhaust gas from the internal combustion engine; and
   an emissions control system including a controller in signal communication with a first oxygen sensor disposed upstream of the bypass catalytic converter, and a second oxygen sensor disposed downstream of the bypass catalytic converter, wherein the emissions control system is configured to perform a diagnostic of the bypass catalytic converter, comprising:
      monitoring, by the controller, signals from the first and second oxygen sensors for a predetermined time period during an engine cold start condition;
      determining, by the controller, a ratio of oxygen content at the second oxygen sensor to oxygen content at the first oxygen sensor based on the signals from the first and second oxygen sensors; and
      comparing, by the controller, the determined ratio to a predetermined threshold ratio to determine if the bypass catalytic converter has failed.

2. The internal combustion engine system of claim 1, wherein the bypass catalytic converter diagnostic is performed only during the engine cold start condition before the main catalytic converter has reached a light-off temperature.

3. The internal combustion engine system of claim 1, wherein performing the diagnostic of the bypass catalytic converter further includes:
   comparing, by the controller, the determined ratio to a second predetermined threshold ratio to determine if the bypass catalytic converter is aged and has reached a useful life threshold.

4. The internal combustion engine system of claim 3, wherein performing the diagnostic of the bypass catalytic converter further includes:
   comparing, by the controller, the determined ratio to a third predetermined threshold ratio to determine if the bypass catalytic converter is meeting predetermined efficiency conditions.

5. The internal combustion engine system of claim 1, wherein the signals from the first and second oxygen sensors are voltage signals indicating an oxygen content of the exhaust gas.

6. The internal combustion engine system of claim 1, further comprising an exhaust manifold configured to supply exhaust gas through a main outlet duct to the main exhaust aftertreatment system and the main catalytic converter,
   wherein the bypass passage is in fluid communication with the exhaust manifold.

7. The internal combustion engine system of claim 6, further comprising a bypass valve configured to move between a first position that enables exhaust gas to flow through the bypass passage, and a second position that prevents exhaust gas flow through the bypass passage and bypass catalytic converter.

8. The internal combustion engine system of claim 7, further comprising a turbocharger having a turbine, wherein the bypass passage is configured to bypass the turbine.

9. The internal combustion engine system of claim 8, wherein when the bypass valve is in the first position, the turbine is operated in a reverse rotation to facilitate preventing the exhaust gas from passing through the turbine.

10. The internal combustion engine system of claim 1, wherein the ratio is determined from an accumulation of oxygen content signals from the first oxygen sensor over the predetermined time period, and an accumulation of oxygen content signals from the second oxygen sensor over the predetermined time period.

11. A diagnostic method for a bypass catalytic converter of an internal combustion engine system comprising:
   an internal combustion engine;
   a main exhaust aftertreatment system with a main catalytic converter configured to receive exhaust gas from the internal combustion engine;
   a light-off catalyst bypass system with a bypass passage and the bypass catalytic converter configured to selectively receive exhaust gas from the internal combustion engine; and
   an emissions control system including a controller in signal communication with a first oxygen sensor disposed upstream of the bypass catalytic converter, and a second oxygen sensor disposed downstream of the bypass catalytic converter, the diagnostic method comprising:
      monitoring, by the controller, signals from the first and second oxygen sensors for a predetermined time period during an engine cold start condition;
      determining, by the controller, a ratio of oxygen content at the second oxygen sensor to oxygen content at the first oxygen sensor based on the signals from the first and second oxygen sensors; and
      comparing, by the controller, the determined ratio to a predetermined threshold to determine if the bypass catalytic converter has failed.

12. The diagnostic method of claim 11, wherein the bypass catalytic converter diagnostic is performed only during the engine cold start condition before the main catalytic converter has reached a light-off temperature.

13. The diagnostic method of claim 11, further comprising:
   comparing, by the controller, the determined ratio to a second predetermined threshold ratio to determine if the bypass catalytic converter is aged and has reached a useful life threshold.

14. The diagnostic method of claim 13, further comprising:
   comparing, by the controller, the determined ratio to a third predetermined threshold ratio to determine if the bypass catalytic converter is meeting predetermined efficiency conditions.

15. The diagnostic method of claim 11, wherein the signals from the first and second oxygen sensors are voltage signals indicating an oxygen content of the exhaust gas.

16. The diagnostic method of claim 11, wherein the light-off catalyst bypass system further includes a bypass valve in signal communication with the controller and configured to move between a first position that enables exhaust gas to flow through the bypass passage, and a second position that prevents exhaust gas flow through the bypass passage and bypass catalytic converter.

17. The diagnostic method of claim 16, further comprising:
   determining, by the controller, if the internal combustion engine is under the cold start condition; and
   moving, by the controller, the bypass valve to the first position if the engine is under the cold start condition.

18. The diagnostic method of claim 17, further comprising:
   determining, by the controller, a low-flow condition exists in the engine exhaust before monitoring the signals from the first and second oxygen sensors.

19. The diagnostic method of claim 11, further comprising illuminating a malfunction indicator light (MIL) if the bypass catalytic converter is determined to have failed.

20. The diagnostic method of claim 11, wherein the predetermined time period is between five seconds and fifteen seconds.

* * * * *